(12) United States Patent
Fung et al.

(10) Patent No.: US 7,861,104 B2
(45) Date of Patent: Dec. 28, 2010

(54) METHODS AND APPARATUS FOR COLLAPSING INTERRUPTS

(75) Inventors: Thomas Fung, Milpitas, CA (US); Patrick Law, Milpitas, CA (US)

(73) Assignee: Broadcom Corporation, Irvine, CA (US)

(*) Notice: Subject to any disclaimer, the term of this patent is extended or adjusted under 35 U.S.C. 154(b) by 1338 days.

(21) Appl. No.: 10/004,458

(22) Filed: Oct. 23, 2001

(65) Prior Publication Data
US 2003/0041252 A1 Feb. 27, 2003

Related U.S. Application Data

(60) Provisional application No. 60/314,699, filed on Aug. 24, 2001.

(51) Int. Cl.
*G06F 1/12* (2006.01)
(52) U.S. Cl. ...................................................... 713/375
(58) Field of Classification Search ................. 380/285; 710/260–265; 712/40
See application file for complete search history.

(56) References Cited

U.S. PATENT DOCUMENTS

| | | | | |
|---|---|---|---|---|
| 5,003,462 A | * | 3/1991 | Blaner et al. ................. | 711/207 |
| 5,121,488 A | * | 6/1992 | Ngai ........................... | 712/229 |
| 5,297,206 A | | 3/1994 | Orton | |
| 5,708,814 A | * | 1/1998 | Short et al. .................. | 710/260 |
| 5,796,836 A | | 8/1998 | Markham | |
| 5,870,474 A | | 2/1999 | Wasilewski et al. | |
| 5,936,967 A | | 8/1999 | Baldwin et al. | |
| 5,943,338 A | | 8/1999 | Duclose et al. | |
| 5,978,830 A | * | 11/1999 | Nakaya et al. ............... | 718/102 |
| 6,111,858 A | | 8/2000 | Greaves et al. | |
| 6,145,017 A | * | 11/2000 | Ghaffari ....................... | 710/5 |
| 6,175,890 B1 | * | 1/2001 | Yamaura ...................... | 710/267 |
| 6,216,167 B1 | | 4/2001 | Momirov | |
| 6,412,064 B1 | * | 6/2002 | Wang et al. .................. | 712/218 |
| 6,629,179 B1 | * | 9/2003 | Bashford ..................... | 710/260 |

FOREIGN PATENT DOCUMENTS

WO     WO 01/80483     10/2001

OTHER PUBLICATIONS

"Applied Cryptography, Second Edition", Schneider, B., 1996, John Wiley & Sons, New York, XP002184521, cited in the application, p. 442, paragraph 18.7-p. 445.
"SHA: The Secure Hash Algorithm Putting Message Digests to Work", Stallings, W., Dr. Dobbs Journal, Redwood City, CA, Apr. 1, 1994, p. 32-34, XP000570561.

(Continued)

*Primary Examiner*—Jeffrey D Popham
(74) *Attorney, Agent, or Firm*—Sterne, Kessler, Goldstein & Fox P.L.L.C.

(57) ABSTRACT

Methods and apparatus are provided for generating interrupts associated with the completion of data processing. An external host may pass a first data block to a first processing engine and later pass a second data block to a second processing engine. In typical implementations, the external host expects that processing of the first data block completes first. To prevent errors and faults on the part of the external host, an interrupt associated with the processing of the second data block completing first is collapsed onto the first data block.

17 Claims, 8 Drawing Sheets

OTHER PUBLICATIONS

Analog Devices: "ADSP2141 SafeNetDPS User's Manual, Revision 6",. Analog Devices Technical Specifications, Mar. 2000, XP002163401, 87 Pages.

C. Madson, R. Glenn: "RFC 2403—The Use of HMAC-MD5-96 within ESP and AH", IETF Request for Comments, Nov. 1998, XP002163402, Retrieved from Internet on Mar. 20, 2001, http://www.faqs.org/rfcs/frc2403.html, 5 Pages.

S. Kent, R. Atkinson: "RFC 2406-IP Encapsulating Security Payload (ESP)" IETF Request for Comments, Nov. 1998, XP002163400, Retrieved from the Internet on Mar. 20, 2001, http://www.faqs.org/rfcs/frc2406.html, 15 pages.

Keromytis, et al., "Implementing IPsec", Global Telecommunications Conference (Globecom), IEEE, Nov. 3, 1997, pp. 1948-1952.

Pierson, et al., "Context-Agile Encryption for High Speed Communication Networks", Computer Communications Review, Association for Computing Machinery, vol. 29, No. 1, Jan. 1999, pp. 35-49.

Sholander, et al., "The Effect of Algorithm-Agile Encryption on ATM Quality of Service", Global Telecommunications Conference (Globecom), IEEE, Nov. 3, 1997, pp. 470-474.

Smirni, et al., "Evaluation of Multiprocessor Allocation Policies", Technical Report, Vanderbilt University, Online, 1993, pp. 1-21.

Tarman, et al., "Algorithm-Agile Encryption in ATM Networks", IEEE Computer, Sep. 1998, vol. 31, No. 1, pp. 57-64.

Wassal, et al., "A VLSI Architecture for ATM Algorithm-Agile Encryption", Proceedings Ninth Great Lakes Symposium on VLSI, Mar. 4-6, 1999, pp. 325-328.

Analog Devices: "Analog Devices and IRE Announce First DSP-Based Internet Security System-On-A-Chip", Analog Devices Press Release, Online, Jan. 19, 1999, pp. 1-3. http://content.analog.com/pressrelease/prdisplay/0,1622,16,00.html.

3Com: "3Com Launces New Era of Network Connectivity", 3Com Press Release, Jun. 14, 1999, pp. 1-3.

"Secure Products VMS115", VLSI Technology, Inc., Printed in USA, Document Control: VMS115, VI, 0, Jan. 1999, pp. 1-2.

"VMS115 Data Sheet", VLSI Technology, Inc., a subsidiary of Philips Semiconductors, Revision 2:3, Aug. 10, 1999, pp. 1-64.

"Data Sheet 7751 Encryption Processor", Network Security Processors, Jun. 1999, pp. 1-84.

Senie, D., "NAT Friendly Application Design Guidelines", Amaranth Networks, Inc., NAT Working Group, Internet-Draft, Sep. 1999, pp. 1-7.

Floyd, Sally, et al., "Random Early Detection Gateways for Congestion Avoidance", Lawrence Berkeley Laboratory, University of California, IEEE/ACM Transactions on Networking, Aug. 1993, pp. 1-32.

Egevang, K., et al., "The IP Network Address Translator (NAT)", Network Working Group, May 1994, pp. 1-10.

Pall, G. S., et al., "Microsoft Point-To-Point Encryption (MPPE) Protocol", Microsoft Corporation, Network Working Group, Internet Draft, Oct. 1999, pp. 1-12.

Deutsch, P., "Deflate Compressed Data Format Specification Version 1.3", Aladdin Enterprises, Network Working Group, May 1996, pp. 1-17.

Kent, S., "IP Authentication Header", Network Working Group, Nov. 1998, pp. 1-22.

Kent, S., et al., "IP Encapsulating Security Payload (ESP)", Network Working Group, Nov. 1998, pp. 1-22.

Maughan, D, et al., "Internet Security Association and Key Management Protocol (ISAKMP)", Network Working Group, Nov. 1998, pp. 1-20.

Harkins, D., et al., "The Internet Key Exchange (IKE)", Cisco Systems, Network Working Group, Nov. 1998, pp. 1-12.

Srisuresh, P., "Security Model with Tunnel-mode Ipsec for NAT Domains", Lucent Technologies, Network Working Group, Oct. 1999, pp. 1-11.

Shenker, S., "Specification of Guaranteed Quality of Service", Network Working Group, Sep. 1997, pp. 1-20.

Srisuresh, P., et al., "IP Network Address Translator (NAT) Terminology and Considerations", Lucent Technologies, Network Working Group, Aug. 1999, pp. 1-30.

Kent, S., et al., "Security Architecture for the Internet Protocol", Network Working Group, Nov. 1998, pp. 1-66.

"Compression for Broadband Data Communications", BlueSteel Networks, Inc., Sep. 8, 1999, pp. 1-9.

"Securing and Accelerating e-Commerce Transactions", BlueSteel Networks, Inc., Revision 2.0, Oct. 20, 1999, pp. 1-7.

"Securing Broadband Communications" BlueSteel Networks, Inc., Sep. 8, 1999, pp. 1-10.

R. Sedgewick, "Algorithms in C—Third Edition", 1998, Addison Wesley XP002163543, pp. 573-608.

\* cited by examiner

| Host Memory 401 | | | | |
|---|---|---|---|---|
| Block 403 | Block 413 | Block 423 | Block 433 | Block 443 |
| Data 405 | Data 415 | Data 425 | Data 435 | Data 445 |
| Status Bit 407 | Status Bit 417 | Status Bit 427 | Status Bit 437 | Status Bit 447 |

| | Younger Control Record Information (501c) | Older Control Record Information (503c) | |
|---|---|---|---|
| Control Record ID (505c) | 0x0 | 0x1 | 517c |
| Interrupt Enable Indicator (507c) | 0x1 | 0x0 | 519c |
| Slot Valid Indicator (509c) | 0x1 | 0x1 | 521c |

| | Younger Control Record Information (501d) | Older Control Record Information (503d) | |
|---|---|---|---|
| Control Record ID (505d) | | 0x1 | 517d |
| Interrupt Enable Indicator (507d) | | 0x1 | 519d |
| Slot Valid Indicator (509d) | 0x0 | 0x1 | 521d |

511d, 513d, 515d

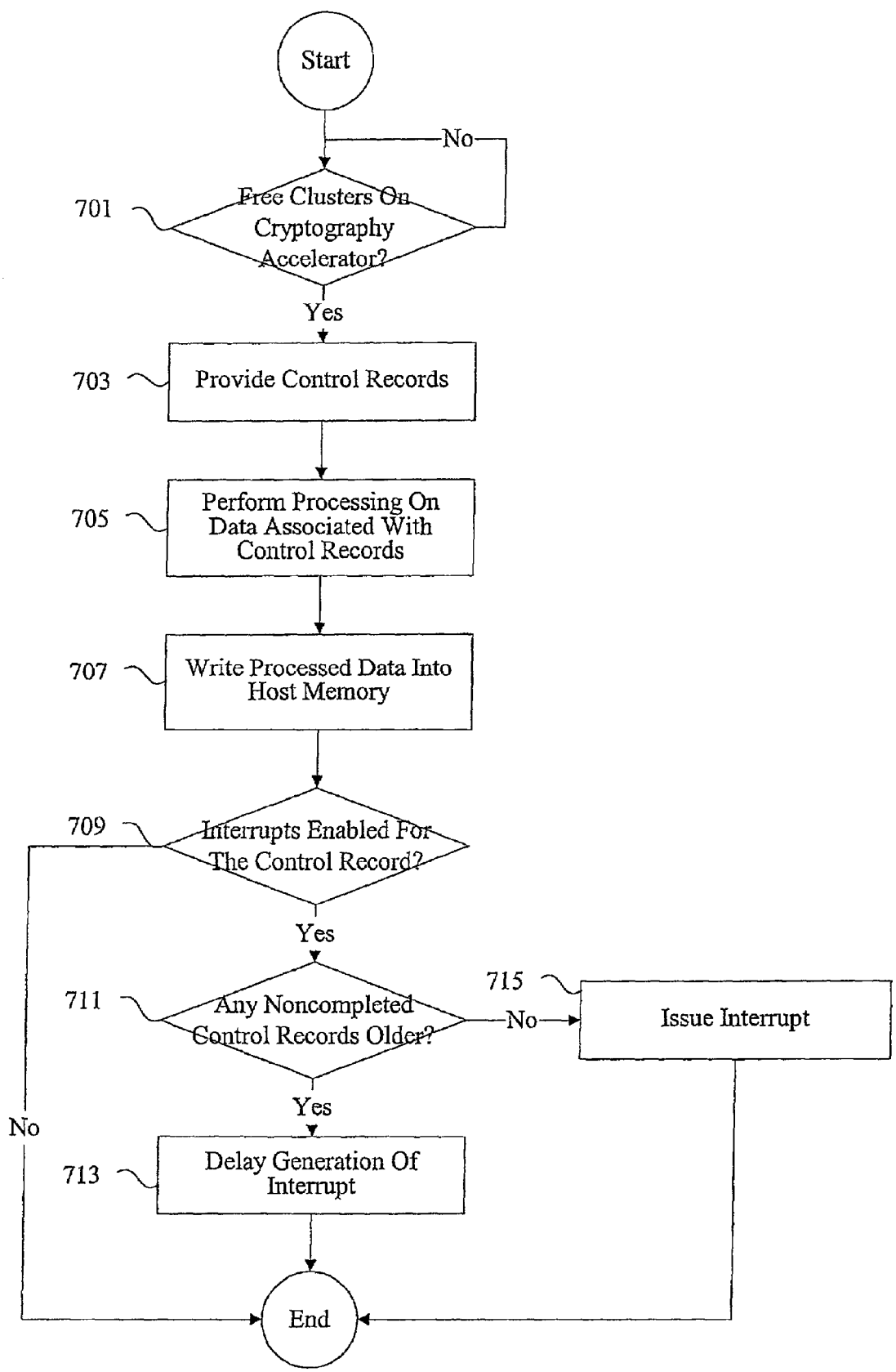

METHODS AND APPARATUS FOR COLLAPSING INTERRUPTS

CROSS REFERENCE TO RELATED APPLICATIONS

This application claims priority under U.S.C. 119(e) from U.S. Provisional Application No. 60/314,699, entitled "Methods And Apparatus For Collapsing Interrupts," as of filing on Aug. 24, 2001, the disclosure of which is herein incorporated by reference for all purposes.

BACKGROUND OF THE INVENTION

1. Field of the Invention

The present invention relates to implementing a cryptography engine. More specifically, the present invention relates to methods and apparatus for handling interrupts from multiple processing engines.

2. Description of Related Art

Conventional software and hardware designs for implementing various cryptography engines often use a single processing engine. In one example, a single processor core is used to handle Internet Key Exchange (IKE) data. IKE and other key exchange algorithms are described in Applied Cryptography, Bruce Schneier, John Wiley & Sons, Inc. (ISBN 0471128457), incorporated by reference in its entirety for all purposes.

Typical implementations pass one block of data at a time to a processing engine. Some of these data blocks are associated with interrupt enable indicators. The interrupt enable indicator instructs the processing engine to generate an interrupt upon completion of processing of the data block. When an interrupt is generated, a host such as an external processor reads processed data blocks up through the data block associated with the generated interrupt. However, the sequential processing technique does not work well when multiple processing records are used. When multiple processing engines are used, data blocks may be processed out of order and the lack of sequence may cause a host such as an external processor to read incorrect data or stall because data blocks were processed out of an expected order.

It is therefore desirable to provide methods and apparatus for improving the handling of interrupts in the implementation of a cryptography engine with respect to some or all of the performance limitations noted above.

SUMMARY OF THE INVENTION

Methods and apparatus are provided for generating interrupts associated with the completion of data processing. An external host may pass a first data block to a first processing engine and later pass a second data block to a second processing engine. In typical implementations, the external host expects that processing of the first data block completes first. To prevent errors and faults on the part of the external host, an interrupt associated with the processing of the second data block completing first is collapsed onto the first data block.

According to one embodiment, a method for processing data using a plurality of processing engines is provided. First data associated with an older control record in a first processing engine is processed. Second data associated with a younger control record in a second processing engine is processed. A first interrupt indicator associated with the younger control record is collapsed onto the older control record when processing of the second data completes before processing of the first data.

The first processing engine can be a public key engine. Collapsing the first interrupt indicator associated with the younger control record onto the older control record can comprise determining that the first interrupt indicator is enabled and can also comprise delaying the generation of an interrupt associated with the younger control record.

Collapsing the first interrupt indicator can further comprise moving the first interrupt indicator associated with the younger control record onto a second interrupt indicator associated with the older control record and setting the first interrupt indicator associated with the younger control record to disabled.

According to another embodiment, a cryptography accelerator is provided. The cryptography accelerator includes an interface coupled to an external processor and memory associated with the external processor, a first processing engine coupled to the interface, the first processing engine configured to receive a first control record from the external processor, a second processing engine coupled to the interface, the second processing engine configured to receive a second control record from the external processor, and a history buffer containing information associated with the first and second control records including a first interrupt indicator associated with the first control record and a second interrupt indicator associated with the second control record.

In still another embodiment, a method for handling interrupts is provided. A first data block associated with a first interrupt indicator set to enabled is received. The first interrupt indicator is configured to cause the generation of a first interrupt upon completion of processing of the first data block. The first data block is processed using a first processing engine. A second data block associated with second interrupt indicator set to enabled is received. The second interrupt indicator is configured to cause the generation of a first interrupt upon completion of processing of the first data block. The second data block is processed using a second processing engine. A single interrupt is generated upon completion of processing of the first and second data blocks.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 4 is a diagrammatic representation of a memory that can be associated with a host.

FIGS. 5A-5D are diagrammatic representations of history buffers. is a diagrammatic representation of DES engine output logic.

FIG. 7 is a process flow diagram showing a technique for interrupt collapsing using delay.

DETAILED DESCRIPTION OF SPECIFIC EMBODIMENTS

Methods and Apparatus for Collapsing Interrupts

Thomas Fung, Patrick Law

The present invention relates to implementing a cryptography accelerator. More specifically, the present invention relates to methods and apparatus for collapsing interrupts to allow simultaneous execution of multiple public key operations.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of public key processing. However, it should be noted that the techniques of the present invention can be applied to a variety of different cryptography processing engines as well as processing engines in general. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
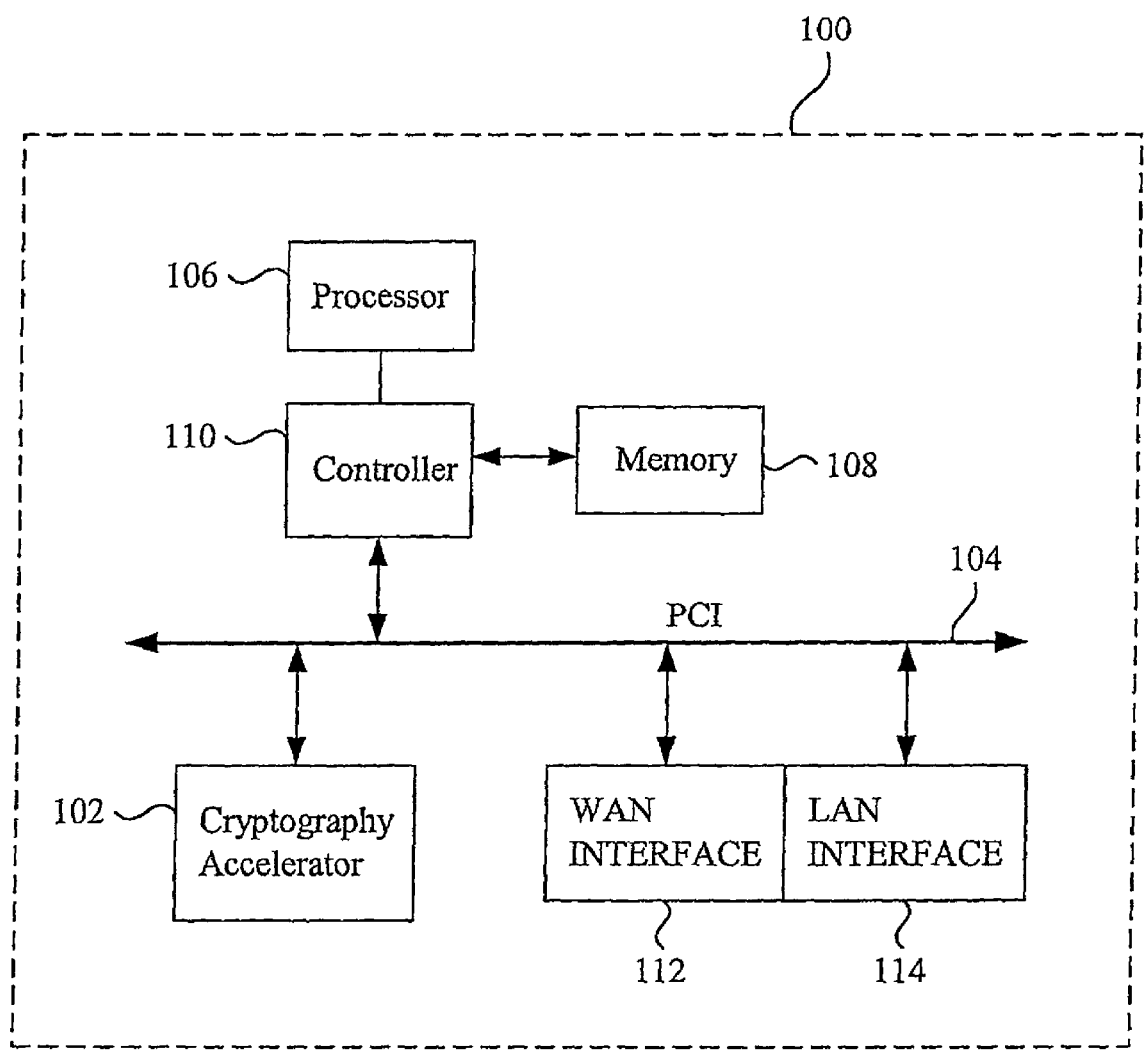
FIG. 1 is a diagrammatic representation of a system that can use the techniques of the present invention.

FIG. 1 is a diagrammatic representation of one example of a cryptographic processing system 100 in accordance with an embodiment of the invention. As shown in FIG. 1, the present invention may be implemented in a stand-alone cryptography accelerator 102 or as part of the system 100. In the described embodiment, the cryptography accelerator 102 is connected to a bus 104 such as a PCI bus via a standard on-chip PCI interface. The processing system 100 includes a processing unit 106 and a system memory unit 108. The processing unit 106 and the system memory unit 108 are coupled to the system bus 104 via a bridge and memory controller 110. Although the processing unit 106 may be the central processing unit or CPU of a system 100, it does not necessarily have to be the CPU. It can be one of a variety of processors in a multiprocessor system, for example. A LAN interface 114 can couple the processing system 100 to a local area network (LAN) to receive packets for processing and transmitting processed packets. Likewise, a Wide Area Network (WAN) interface 112 connects the processing system to a WAN (not shown) such as the Internet and manages in-bound and out-bound packets, providing automatic security processing for IP packets.

A cryptography accelerator 102 can perform many cryptography algorithms including public key processing associated with Internet Key Exchange (IKE) processing using control records such as Message Control Records (MCRs). Public key processing is described in Applied Cryptography, Bruce Schneier (ISBN 0471128457), the entirety of which is incorporated by reference for all purposes.

The control record can contain multiple Internet Key Exchange (IKE) packets. Any structure that contains data as well as information on the operations to be performed on the data is referred to herein as a control record.

Figure 2:
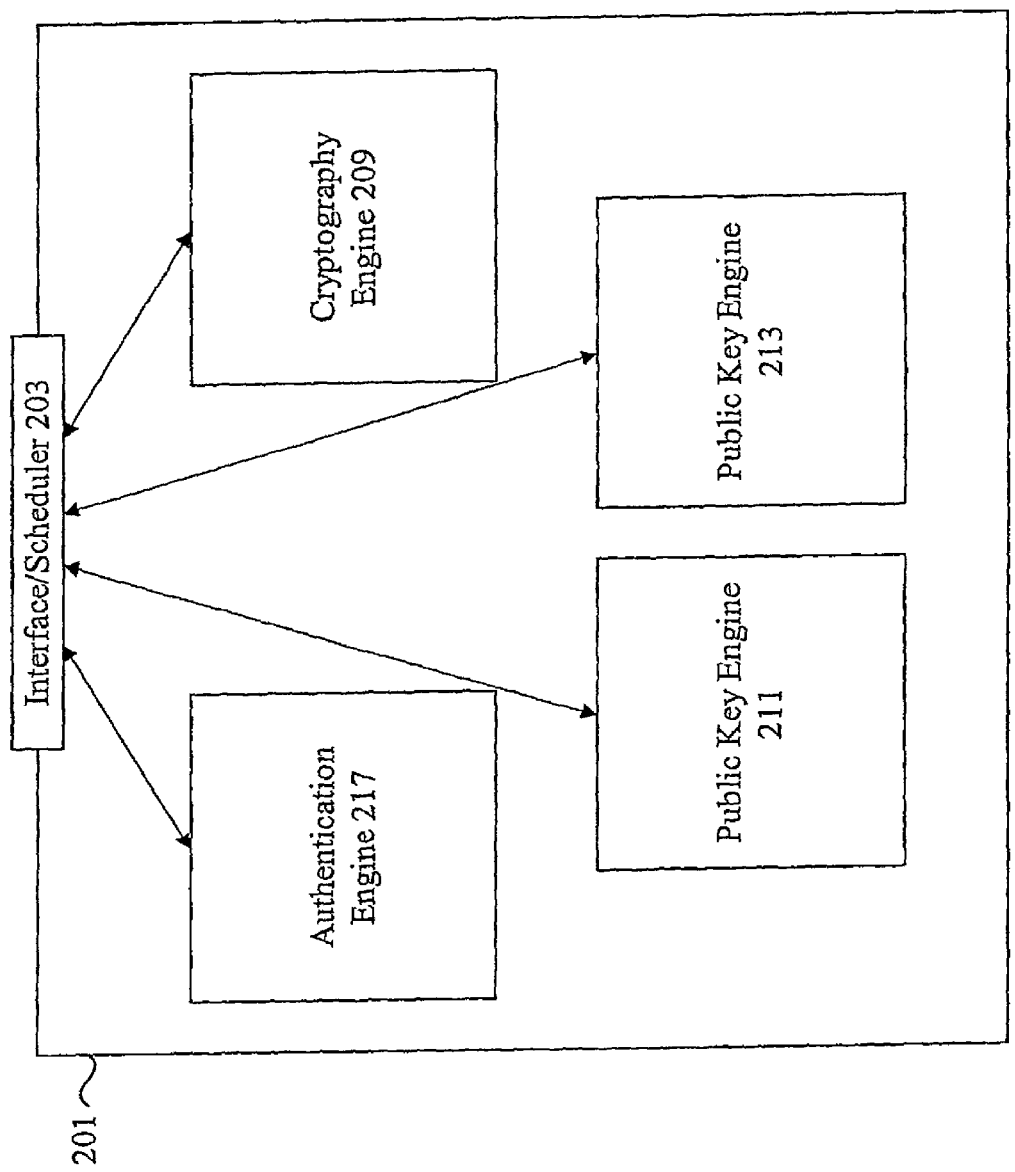
FIG. 2 is a diagrammatic representation of a cryptography engine having an authentication engine, cryptography engine, and multiple public key engines.

FIG. 2 is a diagrammatic representation of a cryptography accelerator 201. The cryptography accelerator 201 includes an interface 203 connected to a host such as an external processor. The interface 203 can receive information from the host for processing and send information to the host when processing is completed. The interface 203 can include a scheduler for determining whether to send data blocks to various processing engines such as authentication engine 217, cryptography engine 209, public key engine 211, and public key engine 213. In conventional implementations, a single public key engine is used in the cryptography accelerator. In these implementations, a control record such as a message command record is buffered in the interface and provided to the public key engine.

When the public key engine completes processing of the control record, processed data is written into a memory associated with the host and an interrupt may be generated to notify the host that processing has been completed. In some instances, several records are processed before an interrupt is generated. In an implementation where multiple public key engines are used, a control record is first passed to a public key engine 211 and another control record is then passed to a public key engine 213. Because the public key engine 211 begins processing first, the host expects that the public key engine 211 will complete first. However, in some instances, the public key engine 213 will complete processing first even though it received a control record later. If a public key engine 213 completes first and issues an interrupt, a host can stall because processing of a control record that was expected to be completed has not yet completed.

Control records that are provided first by a host to a processing engine are herein referred to as older control records. Control records that are provided to the processing engine subsequently are referred to herein as newer or younger control records. According to various embodiments, a host expects processing of older control record to complete before processing of younger control record completes. If processing of a younger control record completes and an interrupt is issued before processing of an older control record completes, a host may not be able to recognize what data has or has not been processed.

Figure 3:
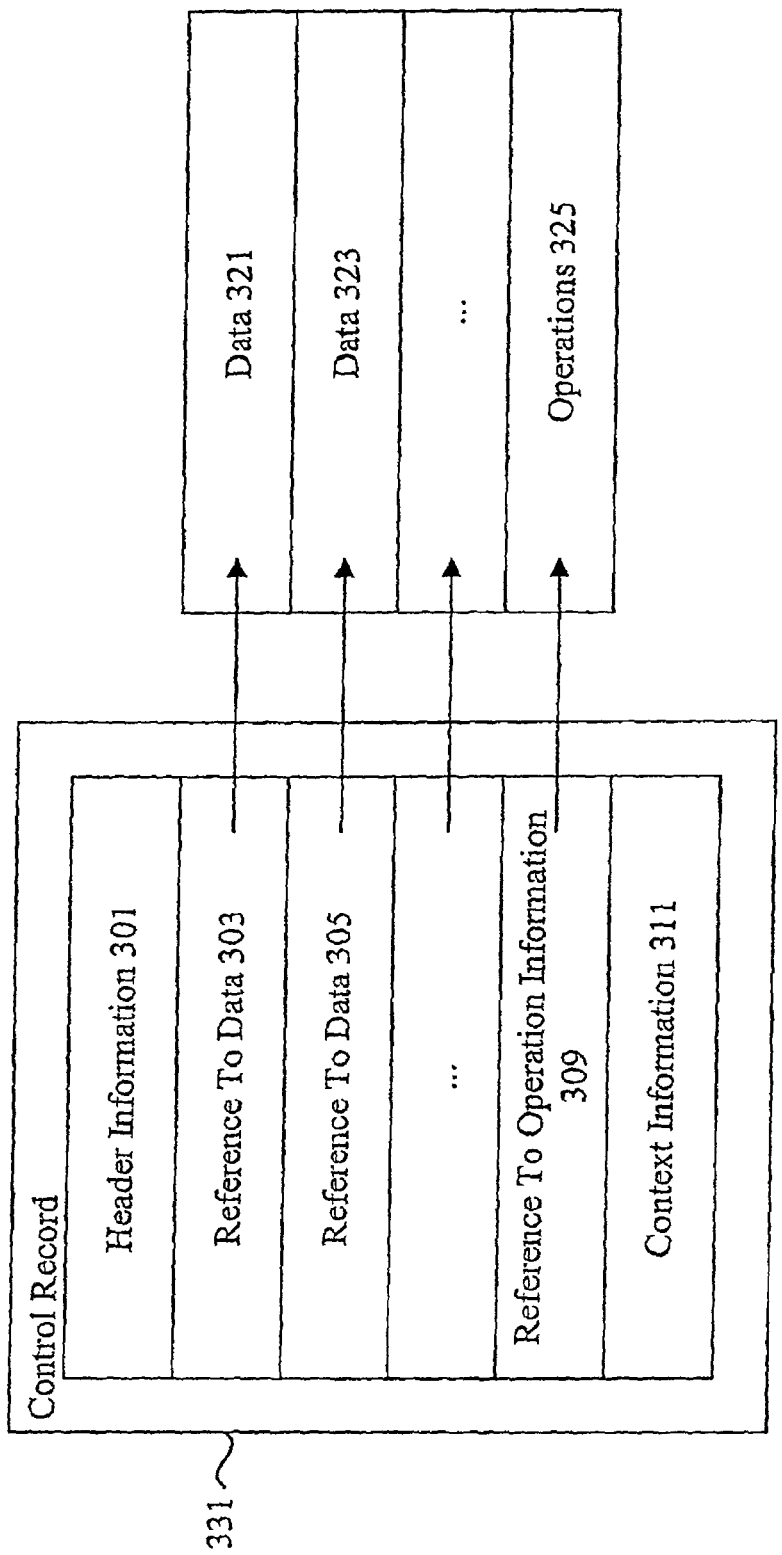
FIG. 3 is a diagrammatic representation of a control record.

FIG. 3 is a diagrammatic representation of a control record 331. As noted above, any structure containing data and information on how to process the data is herein referred to as a control record. The control record 331 can include header information 301 to indicate to a scheduler where the control record should be passed. The control record can also contain data, references to data, or pointers to data 303 and 305 that indicate where the data 321 and 323 reside in memory. According to various embodiments, the control record is object-oriented and contains data and references on how to process the data. The information on how to process the data (309) can be contained in memory as well. Typical operations for public key processing include RSA and Diffie-Hellman.

Control records can also include context information 311, such as an indicator showing whether an interrupt should be issued after the control record is completed. When data 321 and 323 are processed using an operation in operations information 325, the control record is herein referred to as processed. It should be noted, that the control record can have a wide variety of formats. In some examples, the control record may include the actual data as well as the actual operations to be performed on the data. In other examples, the control record can include other context information 311 such as error codes for use during processing.

According to various embodiments, the control record provides pointers to the data resident in memory associated with the host. When a processing engine completes processing of the data, the processed data can be written to a location identified by the pointer or reference.

FIG. 4 is a diagrammatic representation of a memory 401 associated with a host. The memory can include multiple blocks 403, 413, 423, 433, and 443. The blocks may be of fixed or variable size. Each block can contain data 405, 415, 425, 435, and 445 as well as a status bit 407, 417, 427, 437, and 447. The status bit may be any indicator that provides information on whether the data contained in the associated block has already been processed. Typically, a processing engine will set an indicator such as a status bit or a completion flag when the data in the associated block has been processed. The status bit may also be associated with error code information. It should be noted that in various embodiments, a completion flag or a status bit is not necessary.

In typical implementations, a control record is associated with each block in host memory 401. Each control record is processed by an engine such as a public key engine. A status bit is set when the data has been successfully processed. However, a host such as an external processor does not read the memory until an interrupt has been generated by a control record. It should be noted that a variety of mechanisms including processor cores can be used to generate the interrupt upon reading the control record. In one example, data 405 and data 415 have been processed but not yet read by a host because an interrupt has not been generated. The corresponding status bit 407 and 417, however, are already set to completed.

Data 425 and data 435 can now be passed into multiple public key engines for processing. In this example, data 425 is passed as an older control record to the public key engine first. Data 435 is then passed as a younger control record to another public key engine. Both status bits 427 and 437 have not yet been set to complete because data blocks 425 and 435 are currently processing. If data 435 is successfully processed first and an interrupt associated with the data 435 is enabled, an interrupt will be generated after the status bit 437 is set to completed. The host then proceeds to read the data 405, 415, 425, and 435. However, the host may get confused when it recognizes that the status bit 427 is not yet set to completed because data 425 has not fully been processed.

Accordingly, the techniques of the present invention contemplate delaying the generation of an interrupt associated with a younger control record processed before an older control record. In one embodiment, the delay can be implemented by collapsing the interrupt enable indicator from a younger control record associated with data 435 to an older control record associated with data 425. Delaying the generation of an interrupt associated with younger data is herein referred to as interrupt collapsing. In one example, interrupt collapsing involves moving an interrupt generator from a younger control record to an older control record. An interrupt generator may be an interrupt indicator that causes a core to issue an interrupt.

FIGS. 5A-D are diagrammatic representations showing a data structure that can be used to track interrupt enable indicators associated with control records. As noted above, each control record contains information for identifying data as well as information indicating how the data should be processed. The control record can also identify whether a host such as an external processor should be interrupted when the data has completed processing. In one example, the data is maintained in memory and the control record has a pointer to the memory location at which the data stored. The processing engine identifies the location of the data and determines how to process the data. When the data has completed processing, a completion indicator or a status bit can be set in memory. The processing engine can also determine whether to generate interrupts based on an interrupt enable indicator associated with the control record.

However, as noted above, generating an interrupt associated with the completion of processing of younger data before processing of older data has completed can cause a host such as an external processor to stall. According to various embodiments, a data structure such as a history buffer shown in FIG. 5A can be used to track interrupt indicators and prevent an interrupt from being generated before processing of older data is completed.

Figure 5A:
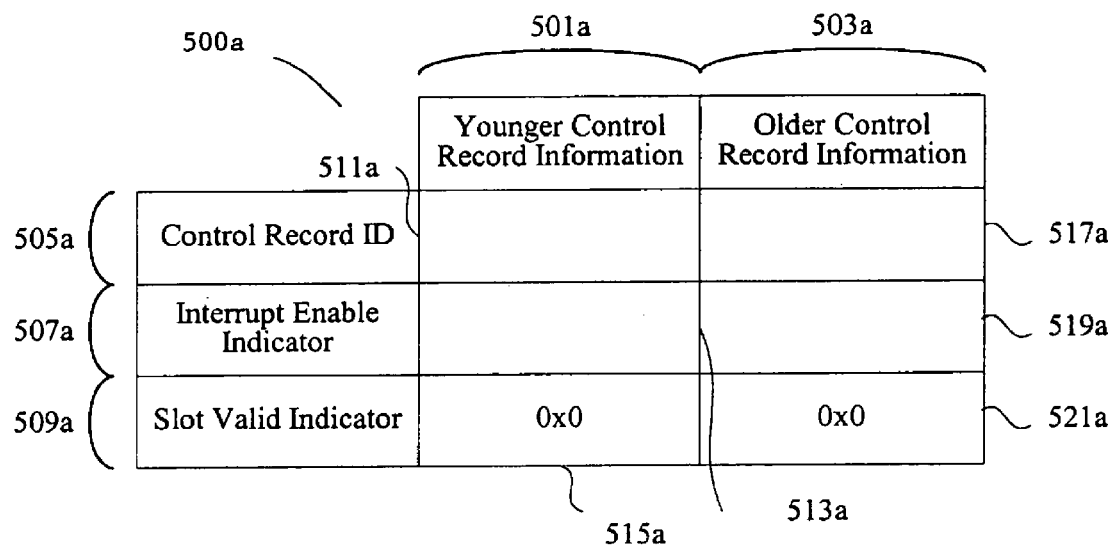

FIG. 5A shows a history buffer containing entries for information 501a associated with the younger control record and information 503a associated with the older control record. In one example, the older control record was passed first to the processing engine while the younger control record was passed second to a second processing engine. The history buffer 500a can contain information and fields for indicating a control record identifier 505a, an interrupt enable indicator 507a, and a valid bit 509a. Any mechanisms or structures for holding information associated with control records to allow manipulation of interrupts is hererin referred to as a history buffer. Although the history buffer can be implemented as a 6-bit buffer, it should be noted that a variety of different mechanisms can be used. In one example, multiple bit fields in a buffer can be used to identify control records. In another example, the control record identifier may be a pointer to the actual data in memory. In still another example, the history buffer may be implemented using registers or memory associated with the processing engine.

Furthermore, the history buffer can contain additional fields for maintaining information about younger or older control records. In one example, four control records can be processed simultaneously using four public key engines. A 12-bit history buffer could be used to maintain information associated with the four control records. In FIG. 5A, the history buffer 500a is shown where data associated with control records have yet to be passed to the processing engine. Consequently, fields 515a and 521a have their slot valid bits set to false. That is, the control records associated with the younger column 501a and the older column 503a do not yet have validly processed data.

Figure 5B:
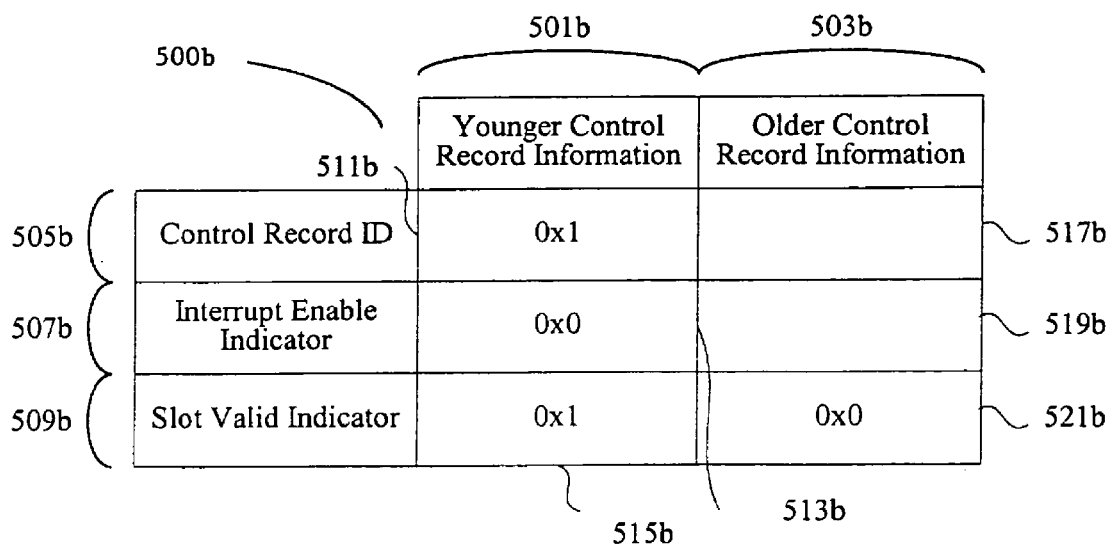

An external host can determine whether a free processor core is available. In one example an external host can check whether an Internet Key Exchange processor core is available to process control records. If it is determined that a processor core is available, a control record is passed to the cryptography engine and information associated with a younger record is written to the history buffer as shown in FIG. 5B.

According to various embodiments, if nothing is currently in the history buffer, information associated with the control record can be written to the younger column 501b in history buffer 500b. The control record ID 511b, the interrupt enable bit 513b and the slot valid indicator 515b can be set. As noted above, some control records may cause a processor core to generate an interrupt after data processing by the processing engine is completed. If an interrupt should be generated, an interrupt enable indicator 513b is set. In some embodiments, this may entail setting a flag to 0x1.

However, in order to avoid disrupting system operation, an interrupt enable indicator may not be set at 513b for certain control records. Triggering interrupts only after a certain number of control packets are processed allows a system to continue operation with minimum disturbance. As noted above, generating interrupts after every control record is processed can significantly disrupt system performance. The slot valid bit 515b can be used to indicate that a control record is available for processing.

It should be noted that a variety of parameters can be used in a history buffer. In one example, the slot valid indicator is not necessary since a control record ID can instead be used to indicate whether data is available. In an embodiment where two processing engines can process data simultaneously, a first control record can be passed first to the processing engine. The history table can then be updated to include information associated with the control record and the information can be contained in the younger column as shown in FIG. 5B. When a second control record is passed to a second processing engine, the formerly first control record contained in column 501b in history buffer 500b moves from the younger column to the older column. That is, information associated with the first control record is moved to column 503c as shown in history buffer 500c of FIG. 5C. In this example, the now older control record is associated with an ID 511c of 0x1, an interrupt enable bit 513c of false or 0x0, and a slot valid indicator 515c of 0x1.

The second control record can then be accepted by the processing engine and information associated with a younger control record can be written into column 501c in history buffer 500c in FIG. 5C. The younger control record can contain an ID 517c of 0x0, and interrupt enable indicator 519c set to 0x1 or true, and a slot valid indicator 521c set to 0x1. It should be noted here that the younger control record has an interrupt enable bit 513c set while the older control record does not have an interrupt enable bit 519c set. In this example, if processing of the older record completes first as expected by the host, an interrupt is not generated. The younger record can then complete and an interrupt can be generated upon completion of processing of the younger data. The external host can then read the data in memory upon receiving notification of the interrupt. According to various embodiments, data in memory is read sequentially. That is, data blocks are arranged in memory in a sequence corresponding to the order in which the data blocks were based to the processing engines. If processing associated with the older control record completes before processing of the younger control record, a memory can be read in sequence and all data read will have already been processed.

However, in some instances, processing of younger data may complete before the processing of older data. An interrupt may then be generated before processing of older data is completed. An external host may get confused by the unexpected sequence of events. As noted above, in typical implementations an external host expects processing of older data to be completed before processing of younger data. If the processing of younger data completes first, a host may stall or read incorrect data. In one example, a host may attempt to read a memory in sequence up to the point where the interrupt was generated. If an interrupt was generated before some of the data in the sequence was completely processed, errors may result.

In order to prevent confusion on the part of the external host, a younger control record can be prevented from generating an interrupt until processing of the older record is completed. According to various embodiments, the cryptography engine can keep track of all control records currently being processed and delay any interrupt generation until all control records have been processed. In one example, interrupt collapsing can be used when the younger control record has been fully processed but the older control record is still being processed.

An interrupt enable bit associated with the younger control record collapses onto the interrupt enable indicator associated with the older control record. That is, an interrupt enable indicator associated with a younger control record can be changed from true to false while the interrupt enable indicator associated with the older control record can be set to true. As noted above, techniques for delaying the generation of an interrupt associated with a younger control record that has been processed before an older control record are referred to herein as collapsing interrupts. One example of interrupt collapsing is the moving of an interrupt enable indicator associated with a younger control record onto the interrupt enable indicator associated with an older control record.

FIG. 5D shows one implementation of interrupt collapsing. The interrupt enable indicator 513d associated with the younger control record is moved onto the interrupt enable indicator 519d associated with the older control record. Since the younger control record has completed processing, the slot valid indicator 515d can be set to false. The control record ID 511d can also be cleared. The older control record is now associated with an ID of 0x1, an interrupt enable indicator set to 0x1 or true, and a slot valid bit of one. With interrupt collapsing, the older control record generates interrupts when processing of the control record is completed even though it would not have generated an interrupt without interrupt collapsing. The older control record generates an interrupt because the interrupt enable indicator associated with the younger control record was moved to the interrupt enable indicator of the older control record.

Figure 6:
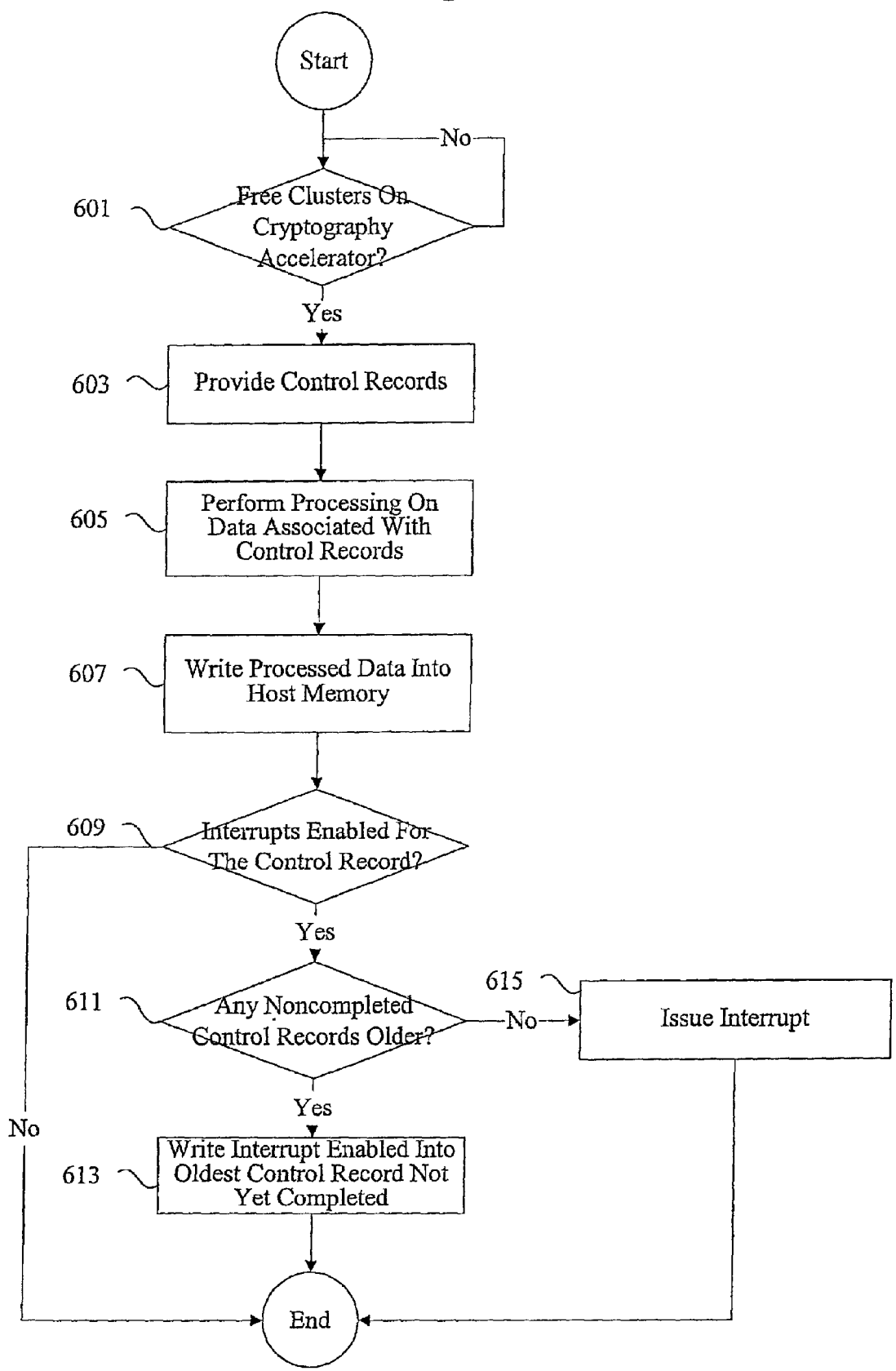
FIG. 6 is a process flow diagram showing a technique for interrupt collapsing.

FIG. 6 is a process flow diagram depicting techniques for collapsing interrupts. At 601, it is determined whether or not free clusters are available on a cryptography accelerator. Free clusters may mean available space in a buffer or FIFO associated with an input interface. If space is available, control records are provided at 603. According to various embodiments, four control records are provided for a cryptography accelerator having two public key processing engines. At 605, processing is performed on the data associated with the control records. At 607, processed data is written into host memory when data processing is complete. A status bit or a completion indicator may be set at this point. At 609, it is determined whether interrupts are enabled for the control record that has recently completed. If interrupts are not enabled, no interrupt collapsing is necessary. If interrupts are enabled for the control record at 609, it is determined at 611 whether any noncompleted control records are older. That is, it is determined whether any control records that were provided first have not yet completed processing. If not, the control record is likely the oldest completed control record and an interrupt is issued at 615.

If there are older noncompleted control records, the interrupt enable indicator associated with the younger control record is move into the oldest control record not yet completed at 613. It should be noted, that multiple younger control records may complete processing before the oldest control record completes processing. Along similar lines, two or more processing engines can be used to process control records simultaneously. Accordingly, multiple interrupt enable indicators may be collapsed onto the oldest control record. For example, a cryptography accelerator may include four processing engines such as IKE processing engines. Four control records can be passed to the four processing engines. The first one passed to the processing engine can be referred to as the oldest control record. All interrupt enable flags associated with the younger control records passed to the three other processing engines can be collapsed onto the interrupt enable flag associated with the oldest control record.

After interrupts enabled indicators are collapsed, the younger control records do not issue interrupts upon completion and an interrupt is instead issued after the oldest control record has completed.

It should also be noted that interrupts collapsing can be implemented with a variety of different techniques. In one example, the time delay may occur before generation of an interrupt associated with the completion of processing of a younger control record. In this example where data associated with a younger control record is processed before data associated with the older control record, the delay may be assigned to the generation of the interrupt associated with a younger control record. That is, instead of generating the interrupt immediately after the younger control record is processed, the interrupt can be generated after a delay such as a delay of a predetermined number of clock cycles. One example of a technique for interrupt collapsing by delaying the generation of an interrupt is shown in FIG. 7.

FIG. 7 is a process flow diagram showing a technique for interrupt collapsing using delay. At 701, it is determined whether there are any processing engine resources available. If it is determined that processing engine resources are available, control records are provided at 703. At 705, processing of the data associated with the control records is performed. It should be noted, in some instances data may be provided in a raw form. That is, data may not be associated with control records. Nonetheless, techniques for interrupt collapsing applied to any form of data that may be associated with the generation of interrupts upon completion of processing of the data.

At 707, processed data is written into memory such as a memory associated with a host or external processor. At 709, it is determined if interrupts are enabled for the data. That is, it is determined if an interrupt should be generated upon completion of processing of the data. If no interrupt should be generated, a process flow diagram completes. If an interrupt should be generated, it is determined whether there are any older control records or any older data that has not yet been fully processed at 711. If not, and interrupt is generated at 715. Otherwise, a delay is introduced at 713. The delay prevents the interrupt from being immediately generated and instead allows for the generation of the interrupt at some later time. According to various embodiments, this later time may be determined by the passing of a given number of clock cycles or later time may be determined by the completion of processing of older data or control records.

It should be noted that many different techniques allow for collapsing interrupts. In the process flow diagrams shown as FIGS. 6 and 7 above, interrupt collapsing occurs after processed data is written into host memory. It should be noted however, that interrupt collapsing can occur at various times. In one embodiment, interrupt collapsing can occur before processing completes or as soon as a control record is received from the external host. In still other embodiments, interrupt collapsing can be used to decrease the number of interrupts generated to increase system performance.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of encryption algorithms and should not be restricted to the ones mentioned above. It is therefore intended that the invention be interpreted to include all variations and equivalents that fall within the true spirit and scope of the present invention.

What is claimed is:

1. A method for processing data using a plurality of processing engines, the method comprising:
   processing first data associated with a first control record in a first processing engine;
   processing second data associated with a second control record in a second processing engine, wherein the first and second data are processed in parallel;
   if processing of the first data completes before processing of the second data completes and the first control record is younger than the second control record, moving a first interrupt indicator associated with the first control record onto a second interrupt indicator associated with the second control record before processing of the second data completes, wherein moving the first interrupt indicator comprises setting the first interrupt indicator associated with the first control record to disabled and setting the second interrupt indicator associated with the second control record to enabled; and
   if processing of the first data completes before processing of the second data completes and the first control record is older than the second control record, generating an interrupt when processing of the first data completes, the interrupt being generated before processing of the second data completes.

2. The method of claim 1, wherein the first processing engine is a public key engine.

3. The method of claim 1, wherein moving the first interrupt indicator comprises determining that the first interrupt indicator is enabled.

4. The method of claim 1, wherein moving the first interrupt indicator comprises delaying the generation of an interrupt associated with the first control record.

5. The method of claim 1, wherein the first control record comprises a reference to data.

6. The method of claim 5, wherein the first control record comprises a reference to an operation to be performed on data.

7. The method of claim 1, further comprising writing processed data to memory associated with a host.

8. The method of claim 7, wherein the host is an external processor coupled to the processing engines.

9. The method of claim 8, wherein the external processor is coupled to the processing engines through a scheduler.

10. The method of claim 9, wherein the external processor reads the processed data when the interrupt is generated.

11. A cryptography accelerator, comprising:
    a first processing engine configured to process a first control record;
    a second processing engine configured to process a second control record, wherein the first and second processing engines are configured to process the first and second control records in parallel;
    a history buffer, implemented using memory, configured to retain information associated with the first and second control records including a first interrupt indicator associated with the first control record and a second interrupt indicator associated with the second control record;
    wherein the first interrupt indicator associated with the first control record is moved onto the second interrupt indicator associated with the second control record if processing of the first control record completes before processing of the second control record completes and the first control record is younger than the second control record; and
    wherein an interrupt is generated if processing of the first control record completes before processing of the second control record completes and the first control record is older than the second control record, the interrupt configured to be generated before processing of the second control record completes, wherein moving the first interrupt indicator comprises setting the first interrupt indicator associated with the first control record to disabled and setting the second interrupt indicator associated with the second control record to enabled before processing of the second control record completes.

12. The cryptography accelerator of claim 11, wherein the first processing engine is a public key engine.

13. The cryptography accelerator of claim 11, wherein moving the first interrupt indicator associated with the first control record onto the second interrupt indicator associated with the second control record further comprises delaying the generation of an interrupt associated with the first control record.

14. The cryptography accelerator of claim 11, wherein the second control record comprises a reference to data.

15. The cryptography accelerator of claim 14, wherein the second control record comprises a reference to an operation to be performed on data.

16. The cryptography accelerator of claim 15, further comprising an external processor coupled to the processing engines through a scheduler.

17. The cryptography accelerator of claim 16, wherein the external processor reads the processed data when the interrupt is generated.

* * * * *